Patented June 20, 1933

1,914,465

UNITED STATES PATENT OFFICE

JULIUS SÖLL, OF FRANKFORT-ON-THE-MAIN-SCHWANHEIM, AND BRUNO HENNIG, OF BITTERFELD, GERMANY, ASSIGNORS TO I. G. FARBENINDUSTRIE AKTIENGESELLSCHAFT, OF FRANKFORT-ON-THE-MAIN, GERMANY

PROCESS FOR PRODUCING 1.1.2-TRI-CHLORO-ETHANE

No Drawing. Application filed January 30, 1930, Serial No. 424,735, and in Germany January 31, 1929.

This invention relates to the production of 1.1.2-trichloro-ethane and is more especially concerned with a process for producing said substance, either alone or together with other chlorine derivatives of hydrocarbons as by-products, from a mixture of acetylene, chlorine and hydrochloric acid gas.

According to the present invention 1.1.2-trichloro-ethane is obtained by causing a mixture of acetylene with chlorine and hydrochloric acid gas to react either by means of catalysts which may be heated, or by applying heat alone in the absence of catalysts. The reaction occurring is represented by the following equation:

$$C_2H_2 + Cl_2 + HCl = C_2H_3Cl_3$$

and is preferably effected in a device consisting, for instance, in a tube which is filled with a finely granulated material, such as pulverized coke or sand. The process according to the present invention allows the employment of non-explosive as well as explosive gas mixtures. When following the latter alternative, the individual gases are directly introduced into a heated reaction chamber of the kind described, the temperature in the chamber being preferably kept at about 200 to about 250° C. When working with non-explosive gas-mixtures the reaction chamber may be filled with coarser pieces of the contact mass (surface catalysts) or heat accumulating material, such as coke, chamotte, quartz, clay, sea salt, pumice, activated carbon or silicic acid. These substances may also be employed after soaking them with certain metal salts. The mixture of gases is kept in circulation in a device essentially consisting of a pump, a reaction chamber, a cooler or washing device, pipes for introducing the gases and for branching off waste gases. During the process, the bulk of trichloro-ethane, formed in the reaction chamber is separated by the cooler or washing device, and the issuing gases are reintroduced after admixing hydrochloric acid gas and chlorine (separately or in mixture) and after further admixing, at another point of the circuit situated before the entrance into the reaction chamber, acetylene in quantities corresponding to the requirements. A small quantity of the gases freed from trichloro-ethane is branched off from the circulating current or discharged uncontrolled by means of a water seal before adding fresh gases, so as to reduce the contents in foreign gases. Preferably, the admixture of chlorine to the circulated gases is effected at a point of the circuit where the velocity of the gases is locally increased so as to avoid self-ignition by a rapid mixing of the gases.

In order to remain below the explosion limit, the foreign gases or hydrochloric acid gas in excess may be allowed to accumulate in the circulating gas mixture. This offers the further advantage that the velocity of the reaction may be increased by raising the reaction temperature, as the tendency to form condensation products is substantially diminished by the presence of these diluents.

Examples (1) A mixture of about 5 parts of acetylene, 2 parts of hydrochloric acid gas and not more than 3 parts of chlorine either containing inert gases or not, is circulated through a layer of pieces of coke heated to about 220° C. and then subjected to condensation. The gases issuing from the condensation device are continuously supplied with acetylene, chlorine and hydrochloric acid gas in a ratio corresponding to about 4:3:3 respectively. According to the degree of contamination of the chlorine by inert gases—which largely depends on the source of chlorine employed—up to 15% of the circulating gas current are discharged by a water seal.

The reaction products obtained at the temperature stated contain

| | Percent |
|---|---|
| Di-chloro-ethylene | 10–15 |
| Tri-chloro-ethane | 60–70 |
| Acetylene-tetra-chloride | 10–25 |
| Products having a higher boiling point | 0–5 |

The yield, calculated on the quantity of acetylene applied, amounts to 90–98%.

Other percentages of composition of the reaction product may be obtained by varying the temperature, the composition of the gaseous reaction mixture, or the velocity of the gases.

(2) In an apparatus provided with means for circulating the gases, a mixture consisting of about 45% of acetylene, 40% of hydrochloric acid, 5% of chlorine and 10% of inert gases is caused to react by passing it, at a temperature of between 80 and 150° C., over activated carbon impregnated with mercury chloride. Before entering the reaction chamber filled with the catalyst, acetylene, hydrochloric acid gas and chlorine are continuously supplied to the circulating gas in a ratio corresponding to about 10:9:9. A small percentage of the circulating gases is, after condensation of the trichloro-ethane, discharged into the open air so as to avoid excessive accumulation of the foreign gases.

The heat developed by the reaction is sufficient to maintain the temperature of the catalyst, additional heating thus being dispensable. Instead of impregnated activated carbon it is also possible to employ merely activated carbon as long as the reaction temperature is kept at a correspondingly higher level.

The raw product obtained has about the following composition:

| | Percent |
|---|---|
| Tri-chloro-ethane (and even more) | 90–95 |
| Dichloro-1-ethane | 1–2 |
| Dichloro-ethylene | 2–4 |
| Acetylene-tetrachloride | 2–4 |

The yield calculated on the acetylene applied depends on the quantity of foreign gases contained in the supply of fresh gases and amounts to 90–98%.

The composition of the gas mixture may be varied without impairing the reaction. By suitably regulating the ratio of the fresh gases supplied, namely acetylene, hydrochloric acid gas and chlorine, the composition of the circulating gas may be maintained at a predetermined ratio. Thus, for instance, it is possible to maintain a high percentage of acetylene in the mixture by supplying comparatively large quantities of this gas or to raise the percentage of hydrochloric acid gas by supplying a larger quantity of the latter. In this case the circulating gas is but little liable to ignition and explosion. The same effect is produced by allowing the foreign gases (nitrogen, carbonic acid etc.) contained in the supply of fresh gases to accumulate in the circulating current.

We claim:

1. The process for producing 1.1.2-trichloroethane, which comprises heating a mixture comprising acetylene, chlorine and hydrochloric acid gas to temperatures up to about 250° C. in the presence of a surface catalyst.

2. The process for producing 1.1.2-trichloroethane, which comprises heating a mixture comprising acetylene, chlorine and hydrochloric acid gas to temperatures up to 150° C. in the presence of a surface catalyst.

3. The process for producing 1.1.2-trichloroethane, which comprises heating to temperatures up to 150° C. in the presence of a surface catalyst, a mixture consisting of acetylene, chlorine and hydrochloric acid gas, in which mixture chlorine is present in an amount not exceeding about 10% of the volume of acetylene.

4. The process for producing 1.1.2-trichloroethane, which comprises heating to temperatures up to 150° C. in the presence of a surface catalyst, a mixture consisting of acetylene, chlorine and hydrochloric acid gas, in which mixture chlorine is present in an amount not exceeding about 10% of the volume of the acetylene, whereas the volume of the hydrochloric acid gas approaches the volume of the acetylene.

5. The process for producing 1.1.2-trichloroethane, which comprises heating to temperatures up to 150° C. in the presence of a surface catalyst, a mixture of reactive and inert gases, the reactive gases consisting of acetylene, chlorine and hydrochloric acid gases, cooling the gases issuing from the reaction chamber, separating the tri-chloroethane formed, discharging a small quantity of the remaining gas into the atmosphere, supplying to the mixture acetylene, chlorine and hydrochloric acid gas in a proportion different from that in the remaining gas and approximately corresponding to the stoichiometric proportion required for forming trichloroethane, and reintroducing the mixture into the reaction chamber.

6. The process for producing 1.1.2-trichloroethane, which comprises heating to temperatures up to 150° C. in the presence of a surface catalyst, a mixture of reactive and inert gases, the reactive gases consisting of acetylene, chlorine and hydrochloric acid gas, in which mixture chlorine is present in an amount below 60% of the volume of acetylene, cooling the gases issuing from the reaction chamber, separating the tri-chloroethane formed, discharging a small quantity of the remaining gas into the atmosphere, supplying to the mixture acetylene, chlorine and hydrochloric acid gas in a proportion different from that in the remaining gas and approximately corresponding to the stoichiometric proportion required for forming trichloroethane, and reintroducing the mixture into the reaction chamber.

7. The process for producing 1.1.2-trichloroethane, which comprises heating to temperatures up to 150° C. in the presence of a surface catalyst, a mixture of reactive and inert gases, the reactive gases consisting of acetylene, chlorine and hydrochloric acid gas, in which mixture chlorine is present in an amount below about 60% of the acetylene, whereas the volume of hydrochloric acid gas approaches the volume of the acetylene, cooling the gases issuing from the reaction chamber, separating the tri-chloroethane formed, discharging a small quantity of the remaining gas into the atmosphere, supplying acetylene, chlorine and hydrochloric acid gas in a proportion different from that in the remaining gas and approximately corresponding to the stoichiometric proportion required for forming tri-chloroethane and reintroducing the mixture into the reaction chamber.

8. The process for producing 1.1.2-trichloroethane, which comprises heating a mixture comprising acetylene, chlorine and hydrochloric acid gas to temperatures up to about 250° C. in the presence of a surface catalyst impregnated with a metal salt chlorination catalyst.

9. The process for producing 1.1.2-trichloroethane, which comprises heating a mixture comprising acetylene, chlorine and hydrochloric acid gas to temperatures up to about 250° C. in the presence of a surface catalyst of the group consisting of coke, sand, chamotte, quartz, clay, sea salt, pumice, activated carbon and silicic acid.

In testimony whereof, we affix our signatures.

JULIUS SÖLL.
BRUNO HENNIG.